(12) United States Patent
Ishikawa

(10) Patent No.: US 7,043,914 B2
(45) Date of Patent: May 16, 2006

(54) EGR SYSTEM FOR INTERNAL COMBUSTION ENGINE PROVIDED WITH A TURBO-CHARGER

(75) Inventor: Naoya Ishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/699,648

(22) Filed: Nov. 4, 2003

(65) Prior Publication Data

US 2004/0093866 A1  May 20, 2004

(30) Foreign Application Priority Data

Nov. 15, 2002  (JP) ............................. 2002-332369

(51) Int. Cl.
  *F02B 33/44* (2006.01)
  *F02M 25/04* (2006.01)
  *F01N 3/02* (2006.01)

(52) U.S. Cl. ...................... 60/605.2; 60/278; 60/280

(58) Field of Classification Search ............... 60/605.2, 60/278, 280; F02M 25/07; F01N 3/02
See application file for complete search history.

(56) References Cited

U.S. PATENT DOCUMENTS

| | | | | |
|---|---|---|---|---|
| 5,440,880 A | * | 8/1995 | Ceynow et al. | ............ 60/605.2 |
| 6,474,060 B1 | * | 11/2002 | Khair | ........................ 60/605.2 |
| 6,526,753 B1 | * | 3/2003 | Bailey | ........................ 60/605.2 |
| 6,681,564 B1 | * | 1/2004 | Nishiyama et al. | ........... 60/278 |
| 6,973,786 B1 | * | 12/2005 | Liu et al. | .................... 60/605.2 |
| 2003/0110760 A1 | * | 6/2003 | Shirakawa | .................... 60/278 |
| 2004/0006978 A1 | * | 1/2004 | Beck et al. | ................... 60/280 |
| 2004/0050047 A1 | * | 3/2004 | Arnold | ...................... 60/605.2 |
| 2004/0050375 A1 | * | 3/2004 | Arnold | ...................... 60/605.2 |
| 2005/0103013 A1 | * | 5/2005 | Brookshire et al. | ........ 60/605.2 |

FOREIGN PATENT DOCUMENTS

| | | | | | |
|---|---|---|---|---|---|
| JP | | 62113814 A | * | 5/1987 | ................... 60/280 |
| JP | | 5-71428 | | 3/1993 | ................ 60/605.2 |
| JP | | 6-66208 | | 3/1994 | ........... 123/528.29 |
| JP | | 07259654 A | * | 10/1995 | |
| JP | | 11210449 A | * | 8/1999 | |
| JP | | 2002188524 A | * | 7/2002 | |
| JP | | 2002276405 A | * | 9/2002 | |
| JP | | 2002285879 A | * | 10/2002 | |

* cited by examiner

*Primary Examiner*—Thai-Ba Trieu
(74) *Attorney, Agent, or Firm*—Staas & Halsey LLP

(57) ABSTRACT

An EGR system for an internal combustion engine provided with a first EGR passage for recirculating EGR gas to the downstream side of a compressor from the upstream side of a turbine of a turbo-charger is provided with a second EGR passage for recirculating EGR gas from the downstream side of the turbine to the upstream side of the EGR gas, and provided also with a DPF in the second EGR passage, while the exhaust gas flow in the first EGR passage and the second EGR passage is controlled based on the exhaust gas temperature detected by an exhaust gas temperature sensor arranged in the exhaust gas passage.

5 Claims, 2 Drawing Sheets

US 7,043,914 B2

EGR SYSTEM FOR INTERNAL COMBUSTION ENGINE PROVIDED WITH A TURBO-CHARGER

BACKGROUND OF THE INVENTION

This invention relates to an EGR system for an internal combustion engine provided with a turbo-charger, which purifies exhaust gas of the internal combustion engine such as a diesel engine.

An internal combustion engine such as a diesel engine is using an EGR (exhaust gas recirculation) system for recirculating a part of the exhaust gas to an air intake passage in order to reduce emission of NOx (nitrogen oxides).

According to the conventional technology, in the internal combustion engine provided with a turbo-charger, an EGR passage for performing the EGR is normally disposed by connecting the upstream side of a turbine with the downstream side of a compressor. The exhaust gas is partly branched from an inlet side of the turbine and recirculated to an outlet side of the compressor.

However, the construction of the EGR passage has a problem that the EGR cannot be carried out as desired in a large type of internal combustion engine. When the internal combustion engine is operated with a high load to improve the turbo-efficiency and to increase the boost pressure, pressure before the turbine is also reduced at the same time. Consequently, pressure differential between the both pressures is reduced; and the differential pressure between the inlet and outlet pressures of the EGR passage is reduced. Hence, EGR gas dose not recirculate to the EGR passage.

In order to solve this problem, various techniques have been devised. Among them, an exhaust gas recirculation system disclosed in the Japanese Laid-Open Patent Publication No. 1993-71428 (Page 3, FIG. 1 and FIG. 2) provides not only an EGR passage branching exhaust gas from the downstream side of a turbine and recirculating it to the upstream side of a compressor but also a variable back pressure control valve arranged further at the downstream side from a branch part of the exhaust gas at the downstream side of the turbine. Optimal EGR gas recirculation pressure is obtained in this system by controlling the variable back pressure control valve, or by controlling the variable back pressure control valve and the EGR valve arranged in the EGR passage at the same time.

Moreover, according to the exhaust gas recirculation system disclosed in the Japanese Laid-Open Patent Publication 1994-66208 (Page 2, FIG. 4), from the upstream side, a soot trap, a heater for rising exhaust gas temperature, a particulate trap for removing dust, and an oxidation catalyst for removing unburnt HC (hydrocarbon) are disposed in an EGR passage. By such disposition, an EGR cooler and an EGR valve arranged at the downstream side of the EGR passage, an air intake port at the intake passage side, an air intake valve, or the like are prevented from being clogged with adhesion of PM and the unburnt hydrocarbons. Further, the EGR passage is branched at the upstream side, so that higher temperature exhaust gas can be recirculated.

However, since the above-mentioned exhaust gas recirculation system is provided with a variable back pressure control valve in the exhaust gas passage, the all amount of the exhaust gas pass through the variable back pressure control valve. Therefore, the variable back pressure control valve has to be large in capacity, and this has been a problem of increasing the cost. Moreover, since the control of the variable back pressure control valve leads to increase the pressure in the exhaust gas passage, so a problem that the turbine efficiency and the fuel cost are worsen may be incurred.

BRIEF SUMMARY OF THE INVENTION

The present invention has been made in order to solve the above-mentioned problems. The purpose of the invention is to provide an EGR system for an internal combustion engine provided with a turbo-charger which is able to secure a pressure differential between an inlet and an outlet of an EGR passage capable of recirculating EGR gas even at the time of a high load, and to efficiently reduce NOx by performing EGR while securing a high EGR rate.

The EGR system for the internal combustion engine provided with a turbo-charger for achieving the purpose as mentioned above is composed by providing an EGR system, which comprises a turbo-charger and a first EGR passage for recirculating a part of the exhaust gas from the upstream side of a turbine of the turbo-charger to the downstream side of a compressor of the turbo-charger, with a second EGR passage for recirculating a part of the exhaust gas from the downstream side of said turbine to the upstream side of said compressor; arranging a diesel particulate filter in the second EGR passage; and also arranging a flow control means for controlling the exhaust gas flow in said first EGR passage and said second EGR passage, and an EGR control means for controlling the flow control means based on the data detected by an exhaust gas state monitoring means.

According to the constitution, the second EGR passage communicates with the upstream side of the compressor from the downstream side of the turbine. Therefore, even when the differential pressure between the inlet and the outlet of the first EGR passage becomes small at the time of high load operation to make the recirculation of a part of the exhaust gas (namely, EGR gas) difficult in the first EGR passage, EGR can be carried out at a high EGR efficiency by recirculating the EGR gas by using the second EGR passage and utilizing suction force of the compressor to recirculate the EGR gas to the air intake side. Consequently, NOx can be effectively reduced.

Further, a diesel particulate filter dedicated to the EGR gas is arranged in the second EGR passage. Therefore, the EGR gas containing particulate matter (PM) such as soot, and unburnt HC or the like can be made to flow into the compressor after having purified with the diesel particulate filter. Thus, the compressor can be prevented from being deteriorated in durability.

Moreover, if the EGR gas is made to pass through the second EGR passage, the EGR gas can be recirculated to the upstream side of the compressor of the turbo-charger. As a result, the EGR gas is mixed well with fresh air, and unevenness of the EGR volume among cylinders is reduced. This means that EGR can be performed to an EGR rate just before a smoke emission amount begins to increase, in the operation range where the smoke emission amount is largely varied with a small variation in the EGR rate. Consequently, the NOx reduction effect can be further improved.

In addition, in the above-mentioned EGR system of the internal combustion engine provided with a turbo-charger, the flow control means is constituted of the first EGR valve arranged in the first EGR passage and the second EGR valve arranged in the second EGR passage; the exhaust gas state monitoring means is constituted of the exhaust gas temperature sensor arranged in the exhaust gas passage; and the EGR control means is constituted so as to control the exhaust gas flow by controlling open/close the first EGR valve and the second EGR valve based on the exhaust gas temperature detected by the exhaust gas temperature sensor.

The use of the EGR valves facilitates the constitution of the flow control means, and also simplifies the control of the EGR amount. The use of the exhaust gas temperature sensor significantly simplifies algorithm for the control of the flow.

In the flow control according to the exhaust gas temperatures, the exhaust gas temperature is also increased when the internal combustion engine is in the range of high load and high engine speed operation, and the differential pressure between the inlet and outlet of the first EGR passage is decreased. Therefore, the control according to the exhaust gas temperature of the exhaust passage can respond to the variation of this differential pressure. Namely, the operation range where the exhaust gas is increased in temperature includes the range where the differential pressure between the inlet and outlet of the first EGR passage is reduced.

Moreover, the flow control means can be composed of a valve or the like arranged at the branch part of the exhaust gas passage and the EGR passage other than the EGR valves mentioned above. In addition, as the exhaust gas state monitoring means, the load, the engine speed, or the like of the internal combustion engine can be utilized. Then, based on map data inputted beforehand, the valve opening degree of the EGR valves are obtained from this load, engine speed, or the like, and the EGR valves can be open/close-controlled based on the valve opening degree. Alternatively, as the exhaust gas state monitoring means, an exhaust gas pressure sensor or the like arranged in the exhaust gas passage and the EGR passage can be used.

Moreover, the above-mentioned EGR system of the internal combustion engine provided with a turbo-charger is composed so as to control the first EGR valve to be open and also the second EGR valve to be closed when the exhaust gas detection temperature is not higher than the regeneration temperature of the diesel particulate filter, and to control the second EGR valve to be open when the exhaust gas detection temperature is higher than the regeneration temperature of the diesel particulate filter.

The fact that this exhaust gas detection temperature is the regeneration temperature of the diesel particulate temperature, means that PM collected by the diesel particulate filter have begun to burn at the temperature and have come to the temperature for self-regeneration (self-regeneration temperature). It does not mean that the exhaust gas detection temperature has become the self-regeneration temperature value. The reason is that even if the exhaust gas detection temperature becomes the self-regeneration temperature, the exhaust gas is cooled before flowing into the diesel particulate filter, and the exhaust gas temperature lowers. Therefore, the regeneration temperature value to the exhaust gas detection temperature is higher than the self-regeneration temperature by the cooled portion.

Furthermore, according to this control, the EGR gas pass through the diesel particulate filter of the second EGR passage only when the exhaust gas detection temperature is higher than the regeneration temperature of the diesel particulate filter. Consequently, clogging or the like of the diesel particulate filter can be avoided, and the regeneration control of the diesel particulate filter can be made unnecessary as well.

Namely, the problems of clogging, melt damage, or the like due to the soot continuously accumulated in the diesel particulate filter can be avoided by recirculating the exhaust gas to the second EGR passage when the exhaust gas temperature is low.

Further, the diesel particulate filter is composed of a diesel particulate filter with an oxidation catalyst. With this constitution, the regeneration temperature capable of burning PM and regenerating the diesel particulate filter can be reduced; therefore, the diesel particulate filter is more surely prevented from clogging or the like.

Moreover, the above-mentioned EGR system of the internal combustion engine provided with a turbo-charger can be constituted by arranging the inlet of the second EGR passage at the upstream side of the turbine instead of arranging it at the downstream side of the turbine. With this constitution, higher temperature exhaust gas can be introduced to the diesel particulate filter.

DETAILED DESCRIPTION OF THE INVENTION

Figure 1:
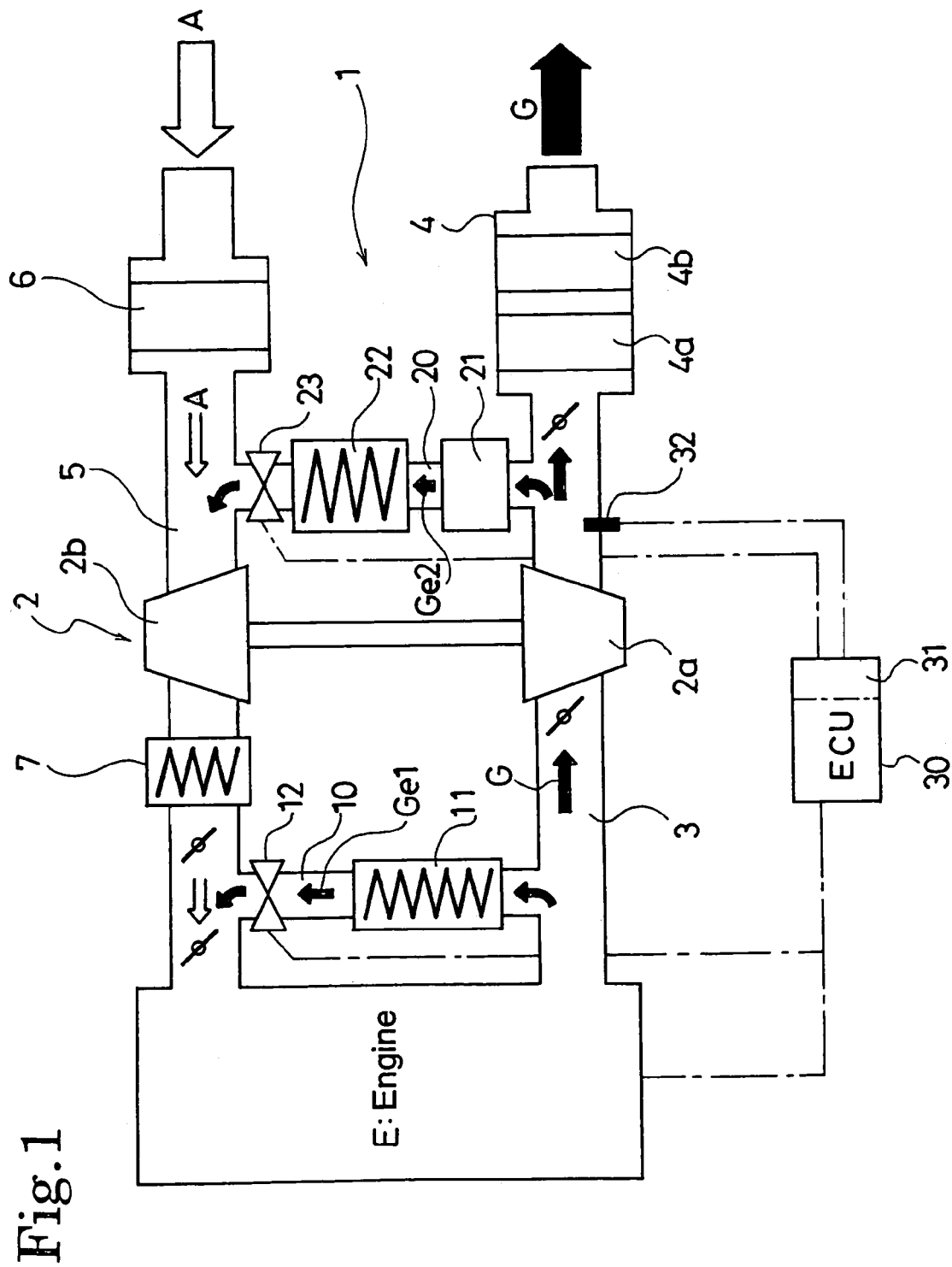
FIG. 1 is a drawing illustrating constitution of an EGR system of an internal combustion engine provided with a turbo-charger in the first embodiment of the present invention.

In the following, embodiments of an EGR system of an internal combustion engine provided with a turbo-charger according to the present invention will be described with referring to the drawings.

As shown in FIG. 1, in a EGR system 1 of an internal combustion engine provided with a turbo-charger in the first embodiment, an engine E is provided with a turbo-charger 2. A turbine 2a of the turbo-charger 2 is arranged in an exhaust gas passage 3 communicating with an exhaust gas manifold of the engine E, and is driven by the exhaust gas of the engine E. In the downstream side exhaust gas passage 3 of the turbine 2a, a diesel particulate filter (hereafter called DPF) 4a and an exhaust gas purifying apparatus 4 having an NOx purifying catalyst converter 4b are arranged.

The compressor 2b driven by the turbine 2a is arranged in an intake passage 5, and sucks and compresses air A coming therein via an air intake filter 6. The compressor 2b then makes the compressed air A pass through an inter-cooler 7 to send it to an intake manifold of the engine E.

Moreover, a first EGR passage 10 is arranged so as to be connected between the exhaust gas passage 3 at the upstream side of the turbine 2a of the turbo-charger 2 and the intake passage 5 at the downstream side of the compressor 2b of the turbo-charger 2. In the first EGR passage 10, a first EGR cooler 11 and a first EGR valve 12 are arranged from the upstream side.

Furthermore, in the present invention, a second EGR passage 20 is arranged, at the downstream side of the turbine 2a of the turbo-charger 2, so as to be connected between the exhaust gas passage 3 at the upstream side of the exhaust gas purifying apparatus 4 and the intake passage 5 at the upstream side of the compressor 2b of the turbo-charger 2. In the second EGR passage 20, a DPF 21, an EGR cooler 22, and a second EGR valve 23 are arranged from the upstream side. Moreover, an exhaust gas temperature sensor 32 is arranged in the exhaust gas passage 3.

The DPF 21 is composed of a DPF with an oxidation catalyst supporting an oxidation catalyst. By the catalytic action of the oxidation catalyst, the temperature capable of burning PM such as soot and regenerating the DPF 21, namely, the regeneration temperature of the DPF 21 can be lowered. As a result, the DPF 21 can more surely be prevented from clogging or the like.

These first EGR valve 12 and second EGR valve 23 constitute the flow control means for controlling the flow of the exhaust gas Ge1, Ge2 in the first EGR passage 10 and the second EGR passage 20. Moreover, the exhaust gas temperature sensor 32 constitutes an exhaust gas monitoring means.

These flow control means can also be composed of the valves or the like arranged at the branch parts from the exhaust gas passage 3 to the EGR passages 10, 20, other than the EGR valves 12, 23. As the exhaust gas state monitoring means, the load, the engine speed, or the like of the engine E can be also utilized. Based on the pre-inputted map data, the valve opening degree is calculated from the load, the engine speed, or the like. Based on the calculated valve opening degree, the EGR valves 12, 23 can be controlled to be open/closed. In addition, as the exhaust gas state monitoring means, exhaust gas pressure sensors (not illustrated) or the like arranged in the exhaust gas passage 3 and the EGR passages 10, 20 can be also used.

An EGR control device 31 as an EGR control means is built in a control device 30, called an engine control unit (ECU), which generally controls the engine E, as a part of the device 30. The engine control device 31 controls the open/close of the first EGR valve 12 and the second EGR valve 23 by inputting the data presenting the operation condition of the engine E such as the load, the engine speed, or the like and the exhaust gas temperature detected by the exhaust gas temperature sensor 32.

Moreover, when opening the valves, the EGR control device does not simply open the EGR passages 10, 20, but also adjusts the openings of the valves according to the running state of the engine E to adjust the EGR amount. Namely, when opening the valves, EGR control is performed at a desired EGR amount according to the running state of the engine E.

Next, the above-mentioned EGR control in the EGR system for the internal combustion engine provided with a turbo-charger will be explained below.

The EGR control is performed by the EGR control device 31 based on the exhaust gas temperature detected by the exhaust gas temperature sensor 32. When the exhaust gas detection temperature is the regeneration temperature of DPF 21 or lower, the first EGR valve 12 is controlled to be open while the second EGR valve 23 is controlled to be closed. Moreover, the EGR control is configured so that the second EGR valve 23 is controlled to be open when the exhaust gas detection temperature is higher than the regeneration temperature of DPF 21.

The fact that the exhaust gas detection temperature is the regeneration temperature of DPF 21 means that the PM collected by the DPF 21 begin to burn and reach the self-regeneration temperature(the temperature for self-regeneration) when the exhaust gas detection temperature becomes the regeneration temperature of the DPF 21. In this case, the exhaust gas detection temperature becomes higher than the self-generative temperature. Namely, the exhaust gas temperature is lowered because the exhaust gas is cooled down before flowing into the DPF 21 from the detection point. Therefore, the regeneration temperature is set higher than the self-regeneration temperature of the DPF 21 considering the temperature decrease due to the cooling.

Moreover, when controlling to open the second EGR valve 23, there is little flow of the exhaust gas Ge1 through the first EGR passage. Hence, the first EGR valve 12 does not specially need to be controlled to be closed. However, when the first EGR valve 12 is controlled to be closed, the EGR volume becomes almost irrelevant to the first EGR valve 12, thus, the EGR volume becomes adjustable only according to the opening of the second EGR valve 23, and this makes it easier to adjust the EGR volume.

In the flow control according to the exhaust gas detection temperature, when the engine E is driven in the operation range of high load and high engine speed and a differential pressure between the inlet and the outlet of the first EGR passage becomes small, the exhaust gas detection temperature also becomes high. Therefore, the EGR control can respond to changes in the differential pressure. Namely, the temperature range of the exhaust gas detection is set so as to cover the operation range of the high speed and high engine speed in which the differential pressure becomes small.

According to this EGR control, since the second EGR passage 20 communicates with the upstream side of the compressor 2b from the downstream side of the turbine 2a according to this EGR control, the EGR gas Ge2 can be recirculated to the suction side by the suction force of the compressor 2b. Namely, even when the recirculation of the EGR gas Ge1 becomes difficult due to the decrease in differential pressure, the EGR can be continued by feeding the EGR gas Ge2 through the second EGR passage 20. Moreover, in order to increase the EGR rate in this EGR control, exhaust gas throttling can be used auxiliary.

Moreover, according to this EGR control, since the EGR gas pass through the DPF 21 only when the exhaust gas detection temperature is higher than the regeneration temperature, clogging or the like can be avoided and the regenerative control can also be made unnecessary. Namely, this control method makes it possible to avoid the problem that if the EGR gas is made to recirculate through the second EGR passage 20 while the exhaust gas temperature is low, PM is continuously collected in the DPF 21 to cause clogging, melt damage, or the like.

Furthermore, since the EGR gas Ge2 passing through the compressor 2b is purified through the DPF 21, the PM in the exhaust gas can be prevented from entering the compressor 2b. Thus, deterioration of the compressor 2b in durability can be avoided.

According to this EGR control, since the differential pressure is large when the engine E is driven in operation range of low load and a low engine speed and the exhaust temperature is low, the EGR gas Ge1 can be recirculated to the air-intake side by using the first EGR passage 10. In this case, therefore, the amount of the EGR gas to the second EGR passage is reduced or halted by the control to close the valve. Thus, the PM can be decreased or prevented from accumulating on the DPF 21 in the second EGR passage 20.

Next, an EGR system 1A for an internal combustion engine provided with a turbo-charger in the second embodiment.

Figure 2:
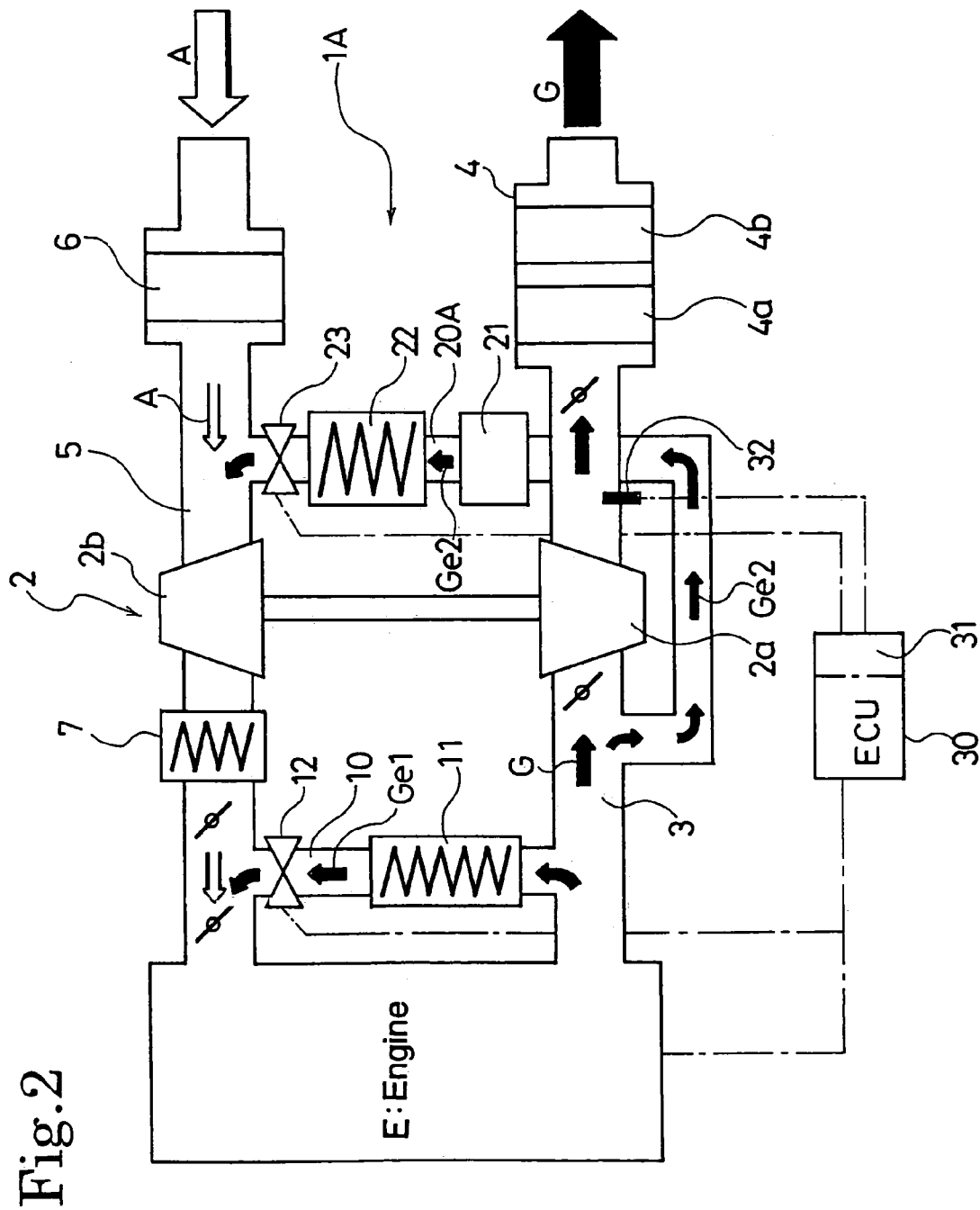
FIG. 2 is a drawing illustrating constitution of an EGR system of an internal combustion engine provided with a turbo-charger in the second embodiment of the present invention.

As shown in FIG. 2, in an EGR system 1A for an internal combustion engine provided with a turbo-charger in the second embodiment, an inlet to a second EGR passage 20A is arranged at the upstream side of a turbine 2a instead of arranging it at the downstream side of the turbine 2a. This is the only point different from the EGR system 1 of the internal combustion engine provided with a turbo-charger in the first embodiment, and the other arrangements are the same.

Since this constitution has the effects similar to those of the first embodiment and EGR can be performed in a wider operation range of the engine E by using the second EGR passage 20A since higher temperature gas can be introduced into the DPF 21.

However, it is necessary to increase the cooling power of the second EGR cooler 22 because the amount of gas entering the turbine 2a decreases by the amount of the EGR gas.

What is claimed is:

1. An EGR system for an internal combustion engine with a turbo-charger, comprising a first EGR passage for recirculating a part of exhaust gas from the upstream side of a turbine of the turbo-charger to the downstream side of a compressor of the turbo-charger, a second EGR passage for recirculating a part of the exhaust gas from the downstream side of said turbine to the upstream side of said compressor, an exhaust gas purifying apparatus with a first diesel particulate filter, a flow control means for controlling the exhaust gas flow in said first EGR passage and said second EGR passage and an EGR control means for controlling the flow control means based on data detected by an exhaust gas state monitoring means, wherein a second diesel particulate filter is arranged in said second EGR passage, and the second EGR passage has an inlet disposed on the upstream side of the first diesel particulate filter.

2. The EGR system for an internal combustion engine with a turbo-charger as claimed in claim 1, wherein an inlet and an outlet of the first EGR passage are disposed at a front side of the turbocharger and the inlet and an outlet of the second EGR passage are disposed at a rear side of the turbocharger.

3. An EGR system for an internal combustion engine with a turbo-charger, comprising a first EGR passage for recirculating a part of exhaust gas from the upstream side of a turbine of the turbo-charger to the downstream side of a compressor of the turbo-charger, a second EGR passage for recirculating a part of the exhaust gas from the downstream side of said turbine to the upstream side of said compressor, an exhaust gas purifying apparatus with a first diesel particulate filter, a flow control means for controlling the exhaust gas flow in said first EGR passage and said second EGR passage, wherein the flow control means is comprised of the first EGR valve arranged in said first EGR passage and the second EGR valve arranged in said second EGR passage, an exhaust gas state monitoring means being comprised of an exhaust gas temperature sensor arranged in an exhaust passage and an EGR control means for controlling the exhaust gas flow by controlling said first EGR valve and said second EGR valve to be open/closed based on the exhaust gas temperature detected by the exhaust gas temperature sensor, wherein a second diesel particulate filter is arranged in said second EGR passage, and the second EGR passage has an inlet disposed on the upstream side of the first diesel particulate filter, and when said detected exhaust gas temperature is not higher than the regeneration temperature of said second diesel particulate filter, said first EGR valve is controlled to be open and said second EGR valve is controlled to be closed, while said second EGR valve is controlled to be open when said detected exhaust gas temperature is higher than the regeneration temperature of said second diesel particulate filter.

4. An EGR system for an internal combustion engine with a turbo-charger, comprising a first EGR passage for recirculating a part of the exhaust gas from the upstream side of a turbine of the turbo-charger to the downstream side of a compressor of the turbo-charger, a second EGR passage for recirculating a part of the exhaust gas from the downstream side of said turbine to the upstream side of said compressor, an exhaust gas purifying apparatus with a first diesel particulate filter, a flow control means for controlling the exhaust gas flow in said first EGR passage and said second EGR passage, and an EGR control means for controlling the flow control means based on data detected by an exhaust gas state monitoring means, wherein the second EGR passage is branched out on an upstream side of the first diesel particulate filter, second diesel particulate filter is arranged in said second EGR passage, and said second EGR passage having an inlet disposed on the side of the upstream first diesel particulate filter.

5. The EGR system for the internal combustion engine with a turbo-charger as claimed in claim 4, wherein the flow control means is comprised of the first EGR valve arranged in said first EGR passage and the second EGR valve arranged in said second EGR passage, said exhaust gas state monitoring means being comprised of an exhaust gas temperature sensor arranged in an exhaust passage, and the EGR control means controls the exhaust gas flow by controlling said first EGR valve and said second EGR valve to be open/closed based on the exhaust gas temperature detected by the exhaust gas temperature sensor.

\* \* \* \* \*